Aug. 16, 1966  I. I. MARKEVITCH  3,266,086
MOLDING APPARATUS
Filed May 1, 1963  2 Sheets-Sheet 1
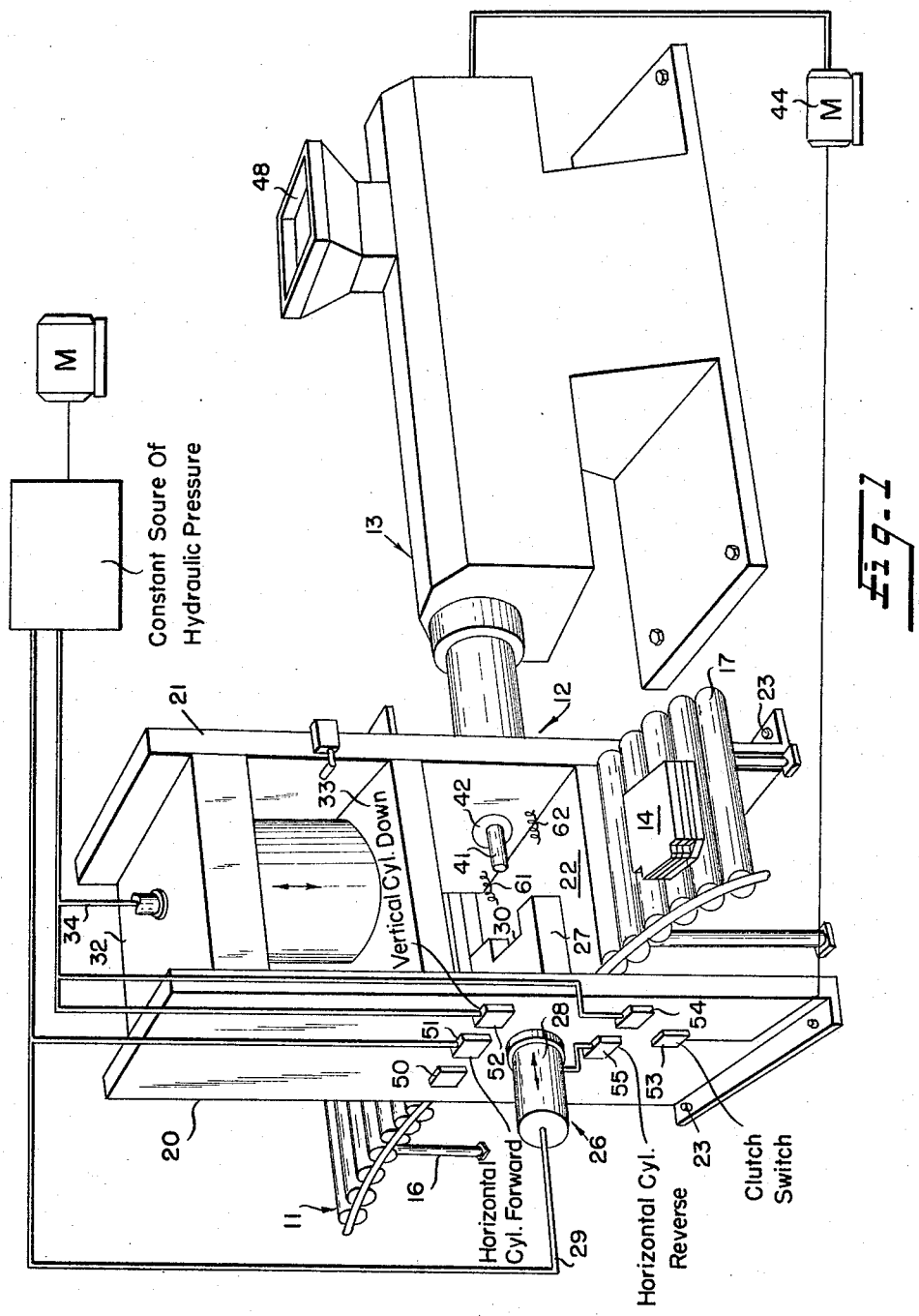
INVENTOR
*Igor I. Markevitch*
BY *Carroll B. Quam Pierce*
ATTORNEY

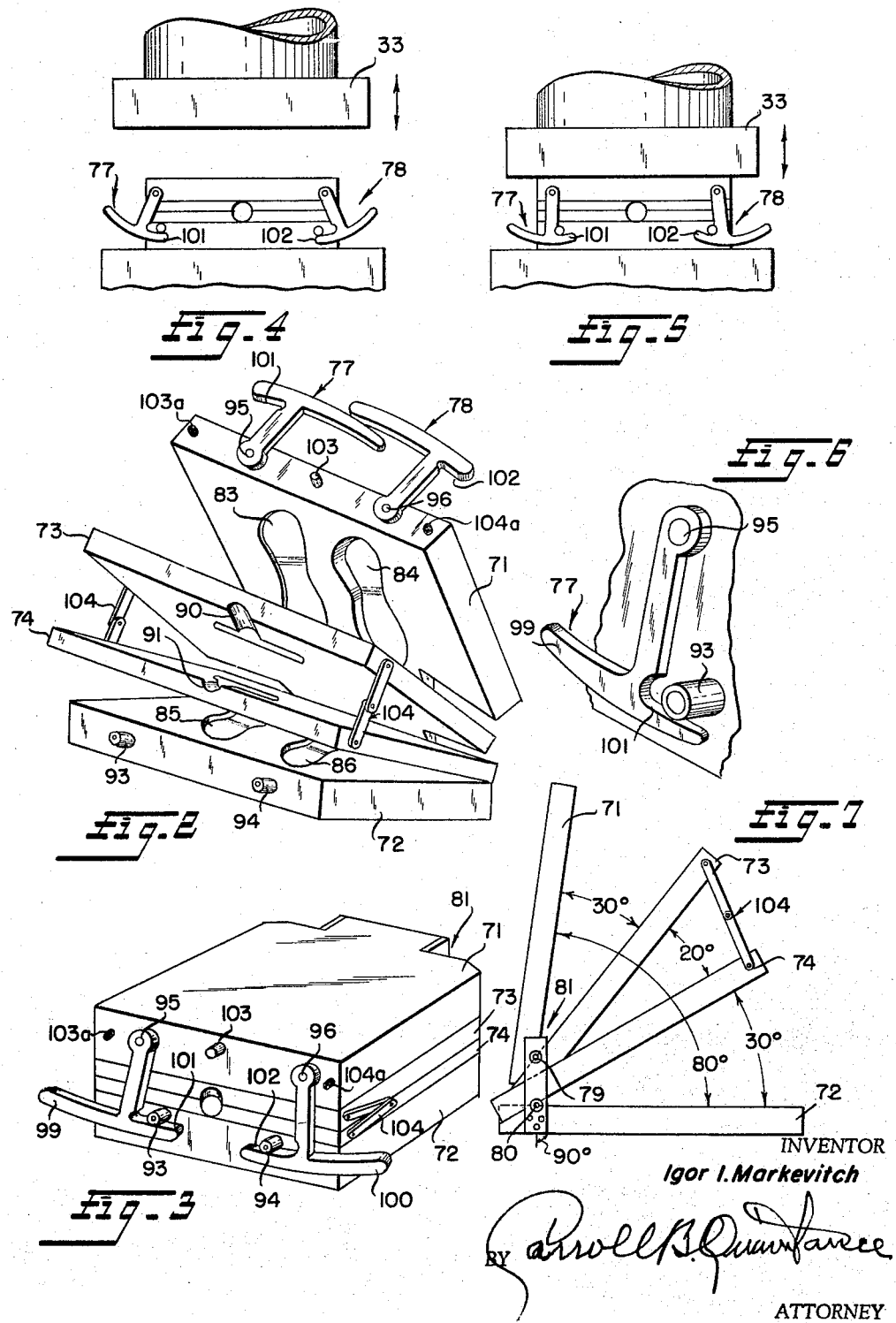

United States Patent Office 3,266,086
Patented August 16, 1966

3,266,086
MOLDING APPARATUS
Igor I. Markevitch, Wayne, N.J., assignor to Arnav Industries, Inc., Little Ferry, N.J., a corporation of Delaware
Filed May 1, 1963, Ser. No. 277,183
6 Claims. (Cl. 18—4)

This invention relates to apparatus for low pressure extrusion molding at pressures below 5000 p.s.i., especially to such apparatus for molding plastic, or resin, articles of manufacture such as unit soles for shoes, and more particularly, to apparatus for low pressure extrusion molding of such articles from vinyl resins which can be molded at pressures between about 1000 and 3100 p.s.i. as, for example, vinyl chloride resins at 2100 p.s.i.

Virtually, all specialized equipment presently available for the manufacture of molded soles and the like consists essentially of an extruder for the plastic feeding directly into unit sole molds generally contained in mold carriers stationed peripherally on an indexing circular platform. Every station on this circular indexing platform requires a hydraulic or pneumatic clamping device for the molds. The hydraulic, or pneumatic, clamping device is designed to close the mold and maintain the closure sealed at the injection station and at succeeding indexing stations, until the molded articles have sufficiently hardened to permit the molds to be opened and the molded articles to be removed therefrom. This equipment, additionally, is designed to automatically index and simultaneously cause the mold carriers to be opened at a specified station after the molded articles have hardened. This latter station is advantageously located in the proximity to the injection station. It will be apparent that this specialized equipment necessitates the use of extensive valving and complex electrical systems and the attending high costs. A complex mechanism such as this has been found to be prone to adjustment interruption and requires high maintenance costs.

Therefore, it is a primary object of the present invention to provide relatively simple apparatus for molding plastic articles of manufacture, especially vinyl plastics which may be molded at the mild pressures mentioned above, rapidly and with a minimum of equipment that requires little maintenance.

Another object is to provide apparatus which has the advantages set forth immediately above, and which is particularly useful for making large numbers of plastic unit soles for shoes.

A further object is to provide apparatus for molding unit soles for shoes, the apparatus requiring no mold change time as such, but merely the addition of a mold to the current cycle or removal of a mold from the conveyor, thereby enhancing the productivity of the apparatus.

Still another object is to provide a unit shoe sole molding apparatus that can be manufactured at a much smaller cost as compared with the cost of conventional apparatus.

Yet another object is to provide a unit sole shoe molding apparatus wherein a second mold can be positioned for injection with plastic molding material with a minimum time loss following the injection period for a first mold.

Still another object is to provide apparatus for molding unit soles that operates more efficiently and with less accent on interchangeability tolerances compared with conventional apparatus.

Another object is to provide relatively simple and reliable apparatus for clamping a mold closed under pressure and for automatically locking the mold closed at the moment the pressure is applied.

Still another object is to provide a mold which makes the molding apparatus of this invention feasible and is so uncomplicated in structure that it can be easily and inexpensively constructed.

A further object is to provide a self-locking mold which has automatic locking means that can be easily operated manually for unlocking and opening the mold.

Yet a further object is to provide a self-locking mold which has a top plate, a bottom plate, at least one intermediate plate, and a plurality of mold cavities which are connected to passageway means in an intermediate plate for injection with fluidized plastic material from an extruder.

A particular object is to provide a mold of the type mentioned immediately above having a plurality of intermediate plates in which the major proportion of the passageway leading from the injector to the mold cavity lies partly in each of two adjacent plates.

The foregoing objects are achieved in accordance with the present invention by apparatus which comprises a circular endless conveyor of the free-rolling type, a single clamping and injection station positioned along the conveyor for receiving an empty mold from the conveyor, and an extruder for injecting molten plastic material into a mold when it is positioned at the clamping station. At the clamping station, the passageways in the mold leading to the mold cavity is advantageously brought into sealing relation with the nozzle of the injector by horizontally movable clamping means having a vertically disposed structural configuration constituting an adaptor mating with a corresponding mold structure so that the nozzle is aligned with a mating recess in the mold and the port to the passageway in the mold. Also, the clamping station is provided with a vertically movable clamping means for holding the mold closed before it is injected with the plastic fluid. Each vertical clamping device should be capable of exercising a pressure at least 15% higher than the internal pressure created by the injection. Each mold is provided individually with gravity operated locking means for locking closed a mold after the application of a required downward pressure by the vertically movable means. Each locking means remains locked after a mold is discharged from the clamping station, thereby permitting the molten or fluidized material in a mold to cool and solidify while the mold travels freely around the conveyor back to an operator positioned next to the clamping station. By virtue of the novel construction of the locking means, after the plastic has hardened and shrunk and the pressure is reduced, each mold can be easily and quickly unlocked and opened by the operator, unloaded, and reinserted into the clamping station to take the place of a mold that has just been injected with molten plastic and is ready to be discharged to the conveyor.

The achievement of the above objects as well as other objects and advantages of the present invention will become more apparent from the following detailed description of the accompanying drawings wherein:

FIGURE 1 is a schematic perspective view of apparatus that is provided in accordance with the present invention for molding unit soles for shoes;

FIGURE 2 is a perspective view of a self-locking mold that is provided in accordance with the present invention for use in the apparatus shown by FIGURE 1, both the mold and gravity-operated locking means therefor being illustrated in open positions;

FIGURE 3 is another perspective view of the self-locking mold, partially broken away, and shows the mold and the gravity-operated locking means in their normal positions prior to the application of downward pressurue upon the mold;

FIGURE 4 is a view of the front side of the self-locking mold and the adaptor of the vertically movable means for applying downward pressure to the mold, this view showing the mold and the gravity-operated locking means in their closed but unlocked positions prior to the application of the downward pressure;

FIGURE 5 is a view of the front side of the self-locking mold and the adaptor of the vertically movable means, this view showing the mold and the gravity-operated locking means in their closed and locked positions after downward pressure has been applied to the mold;

FIGURE 6 is a perspective view, partially broken away, of one of the locking elements at the front of a mold, and FIGURE 7 is a vertical cross-sectional elevational view showing the location of the hinges and a pivot point about which the plates of the mold rotate when the mold is opened and closed.

Referring to FIG. 1 the arrow 11 refers generally to an endless conveyor, partially shown, arrow 12 refers generally to a single clamping station that is positioned along the conveyor, and arrow 13 refers generally to an extruder for injecting molten plastic material into a mold that has been fed to the clamping station. The operator of the apparatus is positioned at the conveyor on the input side of the clamping station for feeding empty molds to the station and for unloading solidified molds that have been discharged from the other side of the station and have solidified while traveling around the conveyor back to the operator. In FIG. 1, an empty mold 14 is shown in position upon the conveyor and is ready to be fed to the clamping station.

The conveyor 11 is supported by a plurality of legs 16. The conveyor is attached to the input and output sides of the clamping station by a suitable means, not shown. Preferably, the conveyor is comprised of a plurality of free-rolling rollers 17 arranged in a generally circular configuration that is intercepted by the clamping station. As a mold is discharged from the clamping station, it will be carried around the conveyor from one group of rollers to the next group until it reaches a location near the feeding side of the clamping station due to a slight downward slope of the conveyor away from the discharge end of the clamping station. When the mold reaches this near location, it will be in front of an operator, or within his reach, so that he can unclamp the mold and open it by hand, or by hydraulic means and remove the molded articles and close the mold. Then the mold can be manually, or hydraulically, positioned so that its mating region fits into the adaptor of the horizontally movable clamping device.

In the alternative, the mold may be carried around the conveyor by an initial momentum imparted to the mold as it is discharged from the clamping station.

A plurality of molds is provided and the number thereof is correlated with the time required for the resin to solidify so that a mold is available for injection at all times. For instance, suppose the injection cycle requires 90 seconds and the time required for hardening of the resin is 9 minutes, then six, or preferably seven or more, molds are provided with a configuration mating with the adaptor region of the horizontally movable clamping device.

The clamping station 12 is composed of a pair of vertically rising side walls 20 and 21. The upper surface of shelf 22 is planar and lies in the plane of the uppermost surfaces of the rollers 17. Bolts 23 secure the clamping station 12 to the floor.

At the clamping station 12, a horizontally movable means, referred to generally by the arrow 26, is supported by the side wall 20 for laterally clamping each mold that is fed to the station. An adaptor of the horizontally movable means has a female recess 30 for mating with a conforming back side of each mold. As shown, the clamping adaptor 30 is reciprocated horizontally back and forth across the face of the shelf 22 by means of a hydraulically operated horizontal drive means 28. The drive means 28 is a hydraulic device, for example, which is connected to the horizontally movable means 26 by a suitable coupling means indicated by the line 29.

Also at the clamping station 12, a vertically movable means, referred to generally by the arrow 32, is supported between the side walls 20 and 21 for clamping a mold. An adaptor 33 at the bottom end of the vertically movable means has a planar face that conforms to the top of a mold for applying a heavy downward pressure to a mold that has been placed upon the shelf 22. The adaptor 33 is reciprocated vertically by means of an hydraulically operated drive means generally designated 34.

The extruder 13 is located laterally of the clamping station 12 in a fixed position. An opening 42 is provided in the vertically extending side wall 21 for receiving the extruder nozzle 41 having a hemispherical head. The nozzle fits into a conforming aperture in the front side of each mold after the mold has been oriented properly upon shelf 22. The nozzle 41 is spaced inwardly from the side wall 22 to provide clearance for a gravity operated locking means, which is an integral part of each mold as is described further below.

The extruder 13 is driven by an electric motor 44 and a dynamically operated clutch (not shown).

A plastic molding material for making soles for shoes, such as a polyvinyl chloride resin, is supplied manually or automatically to an extruder hopper 48. The extruder contains known heating means (not shown) for converting the molding material into a molten or flowable state. The molten material, in a semifluid state, is moved forward to the extruder nozzle 41 by a conventional extruder screw (not shown). Molten material under pressure is injected from the nozzle 41 when the extruder is operated.

As the extruder is operated, it injects molten plastic under pressure into a mold cavity that has been oriented properly and has been clamped under pressure at the clamping station until a desired pressure is built up in the mold.

Basically, the actual operation of the apparatus is conventional and may be controlled manually or automatically. In the simplest, and possibly the least expensive embodiment of the invention, the operation of the apparatus is controlled manually and is illustrated schematically in FIG. 1. Regardless of the method used, conventional devices are used to preset the system so that a desired maximum pressure is developed in the clamping devices and the extruder.

The operation of the apparatus shown in FIG. 1 is as follows: Molds, discussed in greater detail later, traveling freely on the conveyor 17, are placed in approximate location upon shelf 24 for injection either manually or pneumatically. The clamping, injection, injection stop and clamp release cycle is now activated by the operator pressing a starting switch 50. Then the horizrntally forward switch 51 is pressed and the desired pressure permitted to be built up. This pressure can be observed on a pressure gauge, but the necessary time for this build up of pressure will be known with practice. At any rate, the horizontal clamping is effected before the vertical clamping is effected. Next, the vertical down switch 52 will be pressed and the desired pressure permitted to be built up in the same way (at least 15% more than the horizontal pressure). A gravity-operated locking means described below is carried by each mold for locking it closed at the moment an adequate downward pressure is applied to the mold at the clamping station is locked, then the clutch switch 53 is pressed to cause the dynamatic clutch to be engaged which, in turn, activates the extruder. Known types of dynamatic clutches can be used, but a water cooled magnetic field unit is preferred. Horsepower requirements will vary with intended use of the apparatus. Using a conventional 3½" screw extruder provided with a nozzle having an orifice of ¼", a 40-horsepower unit is required to provide an output of about 200 pounds of a typical polyvinyl chloride formulation per hour. When adequate pressure is built up in the mold and extruder, the clutch switch may be cut off or the dynamatic clutch may be disengaged by a preset pressure switch. In either event, the clutch is caused to disengage, thereby stopping the extruder and the injection process.

When the injection is completed, the vertical up switch 54 is pressed up and the vertically movable clamping means 32 is returned to its up position. Likewise, a pressing of the horizontal return switch 55 returns the horizontally movable means 26 to its retracted position.

The introduction of another mold into the area of the extruder nozzle forces the now plastic filled mold away from this area onto the roller conveyor 17 where it takes its place behind other molds traveling on the conveyor which are either filled, in the process of having the molded product removed, or empty. Thus, one cycle has been completed and another cycle can be started by pressing the starting switch again.

In a somewhat more complicated system, not illustrated, the system may be automatically controlled, apart from a throwing of the starting switch 50, by providing known pressure activated switches. In this system, the "on switch" activates the horizontally movable clamping means 26. When the desired preset pressure is reached, a pressure switch is activated which initiates the downward movement in vertically movable clamping means 32. Likewise, when a desired downward preset pressure is reached, a pressure switch activates the dynamatic clutch which drives the injector until a desired preset pressure is built up in the mold. When the desired preset mold pressure is reached, a pressure switch simultaneously deactivates the clutch and activates the return of the horizontally movable clamping means 26 and the vertically movable clamping means 32 to their original position. Upon the return of the clamping devices 26 and 32, starting switch 50 may be manually, or automatically thrown to the off position.

The springs 61 and 62 are compressed when the mold is in position for injection and move the mold away from the nozzle when the horizontal and vertical pressure on the mold is released. The pressure built up in the extruder also propels the mold away from the nozzle. Thus, this mold is no longer held in any way and can move freely.

While as few as a total of eight molds can be used in the system described herein, a lesser number of molds is not recommended since the interval after filling of a mold with the plastic and when it can be refilled will be governed by the time required by the plastic which was injected into the mold to cool and harden sufficiently for removal. The cooling and hardening time will vary with conditions such as temperature of the plastic stock when injected, mold construction, size and configuration of molded product and room temperature. In order to obtain an unmarred, high quality product it is best to extend the cooling and hardening period on the conveyor. The hardening period may be most economically extended by using more molds in the injection-conveyor sequence.

In accordance with other important features of the invention, each of the self-locking molds, shown in detail in FIGURES 2–6, is composed of first and second cover plates 71 and 72, a pair of intermediate plates 73 and 74, a gravity operated locking means comprising a pair of locking elements 77 and 78, and two pairs of hinge means generally designated by 79 and 80 for opening and closing the plates. The pins for the hinge means fit into openings in metal supports attached to plate 72, generally indicated by 81, and pass through cylindrical collars provided on adjacent plates in the usual manner. For example, the hinge pins of 79, in the usual manner, pass through a collar attached to plate 71 which nests in plate 73 and, if desired, the collars may have hardened inserts, thence into a collar attached to 73 and nested in plate 71. In the alternative, the collars may be embedded in one plate and nested in the adjacent plate. The hinge means are made from properly hardened materials to withstand continued wear without permitting movement of the plates in the direction perpendicular to the faces of the mold.

A pair of mold cavities 83 and 84 conforming to the bottom sides of right and left shoe soles are provided in the inner face of the cover plate 71. A further pair of mold cavities, not shown, are provided in the face of the intermediate plate 73 that lies next to cover plate 71. The further pair of mold cavities conform to the top sides of the right and left shoe soles. These types of mold cavities are conventional. The further cavities are matched with the cavities 83 and 84 for making one pair of unit soles for shoes.

A pair of mold cavities 85 and 86 are provided in cover plate 72 and another further pair of mold cavities, not shown, are provided in intermediate plate 74 for making another pair of unit soles for shoes. The mold has four cavities, but instead fewer cavities or a greater number of cavities per mold could be used. Four cavities are preferred, however, due to the factor of necessary correlation of injection time and change time (removal of molded components and closure of the mold). Fewer cavities contribute to a waiting period between cycles on the part of the operator and conversely more cavities would create a situation where the molding unit would remain idle during the mold charge time.

A passage 90 is provided in the intermediate plate 73 for injecting the molten molding material into the mold cavities between plates 71 and 73. Also, a passage 91 is provided for injecting molding material into the mold cavities between plates 72 and 74. Parts of passageways 90 and 91 (not shown) lead upward and downward through tapered channels into the heel portions of cavities discussed above. Parts of each of the passages 90 and 91 together form a hemisphere which conforms to the head of nozzle 41 of the extruder for injecting the molding material into the four cavities simultaneously. It will be observed that passageways 90 and 91, for the most part, are split cavities positioned between two plates. In this way, solidified plastic is easily and completely removed from the passageways to permit other injections into the mold.

The gravity operated locking means is located at the front of each mold and is composed of the locking elements 77 and 78 and catch means comprising roller elements 93 and 94. Pivot means 95 and 96 support the locking elements 77 and 78, respectively, upon the front side of cover plate 71. The roller elements 93 and 94 are supported upon the front side of cover plate 72 by suitable pins.

The locking elements 77 and 78 are T-shaped. Each element has an offset center of gravity. Legs 99 and 100 of the elements 77 and 78, respectively, form handles for unlocking the mold. Curved lips 101 and 102 are provided for rolling easily over the rollers 93 and 94 when the locking elements 77 and 78 are operated.

The principle of the locking mechanism, which is an integral part of each mold, is essentially the counterweight function of the outsized handles 99 and 100. In FIGURE 4, the locking elements 77 and 78 are shown in normal positions prior to the application of downward pressure applied to the top of the mold, which is closed. In these normal positions, the lips 101 and 102 of the locking elements do not clear the rollers 93 and 94 and the mold is not yet locked closed.

Referring now to FIGURE 5, at a moment when the downward pressure produced by the vertically driven adaptor 33 is sufficient to produce absolute mold closure, the locking elements by virtue of their offset centers of gravity are gravity biased to take up the difference between normal and absolute closure. The lips 101 and 102 move over the rollers 93 and 94 until notches in the sides of locking elements 77 and 78 strike the rollers laterally. The position of the pivot point and the center of gravity of each locking element and the position of the roller of each catch element are related so that the elements 77 and 78 are gravity biased against the rollers 93 and 94, respectively. The design and specifications of the lock elements 77, 78 and the roller catch elements (and pin supports) are such as to overcome any internal forces normally generated within the mold during and after filling the mold cavities.

In using a self-locking mold having gravity operated locking means in the apparatus shown in FIGURE 1, it is apparent that the mold will remain tightly closed and locked after the vertically driven adaptor 33 is raised. Therefore, a mold can be discharged from the table 22 immediately after it has been filled with molten plastic material. After a mold has traveled around the conveyor 11 and it is returned to the operator, the mold is easily opened manually by the handles 99 and 100 of the locking means.

As is known, vinyl resins shrink when hardened so internal pressure does not render the opening of the molds difficult. In order to facilitate more rapid handling of a mold, i.e., the opening and closing of same by hand, spring loaded arresting devices 103a and 104a are secured to the top cover plate 71 and project beyond the front of the mold to maintain the locking elements 77 and 78 on a convenient bias in open positions. In most instances, the center of gravity of locking elements 77 and 78 is such that they are biased upright when the molds are open so that springs 103a and 104a are optional.

As shown in FIG. 7, the top plate 71 is opened almost to the vertical position (80% with horizontal). As shown, for illustrative purposes, there is a 30° angle between plates 71 and 73 and between plates 74 and 75 to facilitate the easy removal of the shoe soles from the respective cavities. Likewise, the 20° angle between plates 73 and 74 is adequate to remove the solidified sprue in passageways 90 and 91. Plate 71 is provided with a lift pin 103 which facilitates the lifting of the plate by a hydraulic means. Plate 71 is provided at its hinge end, beginning at a location opposite the axis of the hinge, with a 30° upwardly extending cut out. In this way, plate 71 can be rotated about its rotation axis 30° before it binds on plate 73. Likewise, plate 73 has an upwardly extending 20° cut out and base plate 75 has a downwardly extending 30° cut out. Thus, where plate 71 is lifted from a horizontal closed position, it first moves through an angle of 30°, then its lower extremity, rotating about its axis of rotation, bears on plate 73, causing it to be opened through 20° at which time collapsible link 104 starts to lift plate 74. Thereafter, plates 71, 72 and 73 continue to move until the bottom of the hinge end of plate 74 is seated on plate 75. It has been found such a hinged mold may be readily manipulated.

It is apparent that changes can be made in the apparatus described above and that different words of description might be used without departing from the scope and spirit of the invention, which is limited solely by the appended claims.

What is claimed is:
1. Apparatus for clamping a mold closed under pressure and automatically locking the mold comprising a mold having first and second cover plates, means for opening and closing said cover plates, catch means secured to one of said plates, gravity operated locking means pivotally mounted upon the other of said plates for cooperating with said catch means, a clamping station for receiving said mold, vertically movable means at said clamping station for clamping said mold closed under pressure, horizontally movable means for clamping a mold laterally at said clamping station, said horizontally movable means having an adapter which has a recess for receiving a conforming side of said mold, and an extruder nozzle fixed laterally relative to said horizontally movable means for pressing into an aperture in the wall of a mold that is clamped against said extruder by said horizontally movable means.

2. Apparatus as set forth in claim 1, wherein said clamping station comprises a pair of vertically extending walls and a horizontally extending shelf supported between said walls, said vertically movable means having an adaptor that is guided by said vertically extending walls for applying pressure to said mold while the mold is supported upon said shelf.

3. Apparatus as set forth in claim 2, wherein said horizontally movable means moves inwardly of said clamping station from one of said vertically extending walls.

4. A self-locking mold comprising first and second plates, means for opening and closing said plates, individual roller catch elements secured to one of said plates and corresponding T-shaped gravity locking elements pivotally supported upon the other of said plates, said locking elements having a curved lip that extends away from the junction between the legs of each of said locking elements for engaging the roller of each catch element to lock said plates in closed position.

5. The mold of claim 4, wherein each T-shaped locking means has one leg that forms a handle for unlocking said locking means.

6. The mold set forth in claim 4, further including a pair of spring loaded arresting devices secured to said other plate for intercepting said T-shaped locking elements to bias said locking elements in open positions.

References Cited by the Examiner
UNITED STATES PATENTS

| | | | |
|---|---|---|---|
| 1,860,429 | 5/1932 | Perrault | 18—43 |
| 1,958,422 | 5/1934 | Dinzl | 18—4 |
| 2,420,709 | 5/1947 | Kopplin | 18—43 |
| 2,874,414 | 2/1959 | Sargent | 18—42 |
| 2,892,214 | 6/1959 | McCarthy | 18—4 X |
| 2,943,357 | 7/1960 | MacMaster et al. | 18—4 |
| 3,021,568 | 2/1962 | Scott | 264—328 |
| 3,078,506 | 2/1963 | Caughey | 18—4 |
| 3,159,701 | 12/1964 | Herter | 264—328 |

J. SPENCER OVERHOLSER, *Primary Examiner.*

MICHAEL V. BRINDISI, *Examiner.*

W. L. McBAY, *Assistant Examiner.*